United States Patent
Gupta et al.

(10) Patent No.: US 10,185,569 B2
(45) Date of Patent: Jan. 22, 2019

(54) PRECISE-RESTARTABLE PARALLEL EXECUTION OF PROGRAMS

(71) Applicant: Wisconsin Alumni Research Foundation, Madison, WI (US)

(72) Inventors: Gagan Gupta, Fitchburg, WI (US); Gurindar S. Sohi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 699 days.

(21) Appl. No.: 13/766,053

(22) Filed: Feb. 13, 2013

(65) Prior Publication Data

US 2014/0229704 A1    Aug. 14, 2014

(51) Int. Cl.
*G06F 9/38* (2018.01)

(52) U.S. Cl.
CPC .......... *G06F 9/3838* (2013.01); *G06F 9/3855* (2013.01); *G06F 9/3859* (2013.01); *G06F 9/3863* (2013.01); *G06F 9/3865* (2013.01)

(58) Field of Classification Search
None
See application file for complete search history.

(56) References Cited

U.S. PATENT DOCUMENTS

| | | | | |
|---|---|---|---|---|
| 5,247,628 A | * | 9/1993 | Grohoski | G06F 9/3885 710/260 |
| 2006/0161421 A1 | * | 7/2006 | Kissell | G06F 9/4812 703/26 |
| 2011/0145798 A1 | * | 6/2011 | Taillefer | G06F 11/362 717/129 |
| 2011/0219208 A1 | * | 9/2011 | Asaad | G06F 15/76 712/12 |
| 2012/0216080 A1 | * | 8/2012 | Bansal | G06F 11/3476 714/45 |

OTHER PUBLICATIONS

Montesinos et al. (DeLorean: Recording and Deterministically Replaying Shared-Memory Multiprocessor Execution Efficiently, Jun. 2008, pp. 289-300).*
Ceze et al. (BulkSC: Bulk Enforcement of Sequential Consistency, Jun. 2007, pp. 278-289).*
Mootaz Elnozahy, Lorenzo Alvisi, Yi-Min Wang, David B. Johnson; A Survey of Rollback-Recovery Protocals in Message-Passing Systems; Survey Paper; Jun. 1999; pp. 1-40; Schoool of Computer Science, Carnegie Mellon University, Pittsburgh, PA 15213, US.
Greg Bronevetsky, Rohit Fernandes, Daniel Marques, Keshav Pingali, Paul Stodghill; Recent Advances in Checkpoint/Recovery Systems; Research Paper; Cornell University, Dept of Computer Science, 8 pages, 2006; Ithaca, NY 14853, US.
James E. Smith, Andrew R. Pleszkun; Implementation of Precise Interrupts in Pipelined Processors; Proc. Computer Architesture; pp. 1-15, 1985 IEEE; US.

(Continued)

Primary Examiner — George Giroux
(74) Attorney, Agent, or Firm — Boyle Fredrickson, S.C.

(57) ABSTRACT

Interrupt handling on a multiprocessor computer executing multiple computational operations in parallel is provided by establishing a total ordering of the multiple computational operations and defining an architectural state at the time of the interrupt as if the computational operations executed in the total ordering.

22 Claims, 6 Drawing Sheets

(56) References Cited

OTHER PUBLICATIONS

Tom Bergan, Joseph Devietti, Nicholas Hunt, Luis Ceze; The Deterministic Execution Hammer: How Well Does it Actually Pound Nails?; Research Paper; pp. 1-7; 2011; University of Washington; US.
Milos Prvulovic, Josef Torrellas; ReEnact: Using Thread-Level Speculation Mechanisms to Debug Data Races in Multithreaded Codes; Research Paper; pp. 1-12; 2003; University of Illinois at Urbana-Champaign, IL; US.
Mootaz Elnozahy, Lorenzo Alvisi, Yi-Min Wang, David B. Johnson; A Survey of Rollback-Recovery Protocols in Message-Passing Systems: Survey Paper; Jun. 1999, pp. 1-40; School of Computer Science, Carnegie Mellon University, Pittsburgh, PA 15213, US.

\* cited by examiner

PRECISE-RESTARTABLE PARALLEL EXECUTION OF PROGRAMS

STATEMENT REGARDING FEDERALLY SPONSORED RESEARCH OR DEVELOPMENT

This invention was made with government support under 0963737 awarded by the National Science Foundation. The government has certain rights in the invention.

CROSS REFERENCE TO RELATED APPLICATION

N/A

BACKGROUND OF THE INVENTION

The present invention relates to a method and computer architecture for parallel execution of programs on multiple processors.

Computer interrupts are signals received by a computer processor that cause the processor to switch from a current execution task or thread to a different execution task or thread (the latter, for example, being an interrupt service routine) typically as designated by an interrupt identifier. The interrupt service routine executed after the interrupt "handles" the interrupt, after which, the former task is resumed.

Interrupts can be generated by hardware or software. Hardware interrupts let a processor respond to external events (for example, the expiration of a timer) without the need for the processor to periodically check for the event in a "polling" operation. Software interrupts may be triggered by a special instruction executed by the processor. Interrupts may be triggered by errors in the execution of an instruction, for example a division by zero, or by other execution faults such as lack of available memory. These latter interrupts are often called exceptions.

Precise interruptability is provided by a processor if the interrupted thread may be resumed without disruption. Precise interruptability generally requires that the architectural state of the processor be well defined at the time of the interrupt so that this architectural state may be restored when the interrupt has been handled. The architectural state captured at the time of the interrupt should reflect completion of all the instructions preceding the interrupted instruction and none of the succeeding instructions.

Precise interruptability is crucial to a variety of system applications including debugging and resource management, and has allowed innovative micro-architectural techniques, such as speculation, a technique that allows the processor to execute instructions past the point of unresolved branch instructions, for example, by predicting how the branch instruction will be resolved. The need to provide for precise interruptability is likely to grow more important as system exceptions caused by transient processor errors grow more common as the limitations of technology are approached. These latter exceptions, which will be termed transient exceptions, are generally independent of the particular instructions being executed, but are driven by sporadic occasional hardware faults caused, for example, by overheating of the circuitry.

While precise interruptability is a common feature of single processors, it is difficult to achieve in parallel processing environments. Parallel processing uses multiple processors which each may simultaneously execute different portions of a program. Unfortunately, the independent operation of these multiple processors results in a complex and distributed architectural state that is difficult to capture on an instantaneous basis. Without an ability to capture architectural state, precise interruptability cannot be obtained, and advantages of precise interruptability are unavailable.

SUMMARY

The present invention allows accurate determination of an architectural state in a multiprocessor system independently executing portions of the program, by enforcing a consistent order in the commitment of the results of those executions regardless of the actual order of the execution. By marking interrupts with respect to this commitment order, an architectural state may be rapidly determined with respect to the interrupt, for example, by committing all earlier executions in the commitment order and squashing all later executions in the commitment order. To this extent then, the invention provides for "precise restartability" rather than "precise interruptability", nevertheless precise restartability provides many of the benefits of precise interruptability.

When precise restartability is provided, the commitment order will be a "total order" of the instructions, an order that is consistent with a "data flow" order that respects data dependencies between computational operations. Yet the total order goes beyond the data flow order by additionally relying on a sequence, such as provided by the program's text, that provides a definitive order when a dataflow order does not exist between instructions (that is, multiple orderings satisfy data flow ordering for the instructions).

As noted, obtaining a precise architectural state for a complex system of multiple processors would seem to require a precise capture and communication of the state of each of the multiple processors, at an instant in time, to a single location for integration into a single architectural state. The present invention effectively avoids this problem by operating before the interrupt to provide a per instruction checkpointing and after the interrupt to bring the architectural state of the system into conformance with one of these checkpoints before releasing the system to the interrupt handling routine. These checkpoints hold simplified information sufficient for precise restarting even though they may not technically represent the actual architectural state of the multiprocessor system at the time of the interrupt.

Specifically then, the present invention in one embodiment provides a method for processing a computer program in a multiprocessor computer system with the following steps. First, the computer program is divided into portions having instructions which may be interrupted and the portions are distributed among multiple processors of the multiprocessor computer system for parallel execution. A total order of the portions is defined that preserves correct resolution of data dependencies among the portions consistent with execution of the computer program on a single processor. At a time an instruction receives an interrupt suspending execution of one of the parallel portions, the total order is used to create an architectural state of the multiprocessor computer system that reflects completion of all instructions of the portions preceding a given portion of the interrupting instruction in the total order and none of the instructions in the portions succeeding the given portion in the total order. After the interrupt is handled, execution of the parallel portions is resumed from the architectural state.

It is thus a feature of at least one embodiment of the invention to allow an architectural state to be defined and used for the handling of interrupts when portions of a program are executed in parallel on different processors.

The interrupts may require data describing the architectural state.

It is thus a feature of at least one embodiment of the invention to provide interrupts that can aid in evaluating program performance or troubleshooting computer programs by providing consistent architectural state at particular points in the program execution.

The method may create a check point with respect to data modified by the portions before a commitment of an execution of the portion so that the portion may be squashed after execution but before commitment. In this regard, the architectural state may be created by first completing all instructions of the portions preceding the given portion in the total order and squashing all instructions in the portions succeeding the given portion in the total order, where instructions when squashed leave substantially no residual effect on the architectural state of the multiprocessor computer system.

It is thus a feature of at least one embodiment of the invention to provide a simple method of capturing and storing architectural state that does not unduly constrain parallel execution. By allowing subsequent completion and squashing of uncommitted computational operations, the architectural state may be determined in a system of distributed processing where a snapshot of processing state would be otherwise difficult to obtain.

Restarting execution of the program after an interrupt may use the committed state of the other processors together with an architectural state for a given processor (using standard processor-based recording of architectural state) having the interrupted instruction.

It is thus a feature of at least one embodiment of the invention to make use of the precise interruptability of standard processors in combination with a coarser architectural state provided by precise restartability to provide improved precision in restarting after an interrupt.

The method may commit execution and squash execution according to the serial execution order of the program.

It is thus a feature of at least one embodiment of the invention to use serial execution order as a simplified way of deriving a total order, the former which may be readily extracted from the program as the program portions are allocated to the separate processors.

The invention may also provide for selective restarting of computational operations independent of capturing architectural state. In this regard, a dataflow ordering of the computational operations is established reflecting data dependencies between computational operations. When a particular computational operation faults and needs to be restarted, only those other computational operations having data dependencies on the faulting operation are squashed and the remainder can continue to execute.

In this case, the invention in one embodiment provides a method for processing a computer program in a multiprocessor computer system starting with the step of dividing the computer program into portions having instructions at least one of which may generate an interrupt and distributing the portions among multiple processors of the multiprocessor computer system for parallel execution. A data flow order of the portions is defined that preserves correct resolution of data dependencies among the portions consistent with execution of the computer program on a single processor. In the event of a fault in execution of a portion on a given processor, dependent portions having data dependencies on the given portion are identified and a given portion and the dependent portions restarted while allowing continued execution of other portions.

It is thus a feature of at least one embodiment of the invention to provide a method of efficiently treating faulting operations on a single processor that does not unduly restrain execution in parallel on other processors of portions without data dependencies.

The method may generate a reorder list having an entry for each portion at a time of discovery of the portion during the dividing process, the reorder list defining a total order of the portions. The reorder list may store information necessary for squashing of the portions and data dependencies may be determined only for portions in the reorder list after the given portion.

It is thus a feature of at least one embodiment of the invention to provide a system that compatibly works with precise restarting using much of the same hardware.

The execution of each portion may be committed according to the ordering of the reorder list, and at the time of committing the entry for each committing portion in the reorder list, may release storage of the information necessary for squashing of the portion.

It is thus a feature of at least one embodiment of the invention to provide a simple method of freeing up resources used for checkpointing computational operations.

In one example, the fault may be a thermal fault.

It is thus a feature of at least one embodiment of the invention to provide an efficient method of treating faults that may remedy themselves solely with repeated execution and without the need for handling an interrupt such as may otherwise require a precise architectural state.

These particular objects and advantages may apply to only some embodiments falling within the claims and thus do not define the scope of the invention.

DETAILED DESCRIPTION OF THE PREFERRED EMBODIMENT

General Hardware Description

Figure 1:
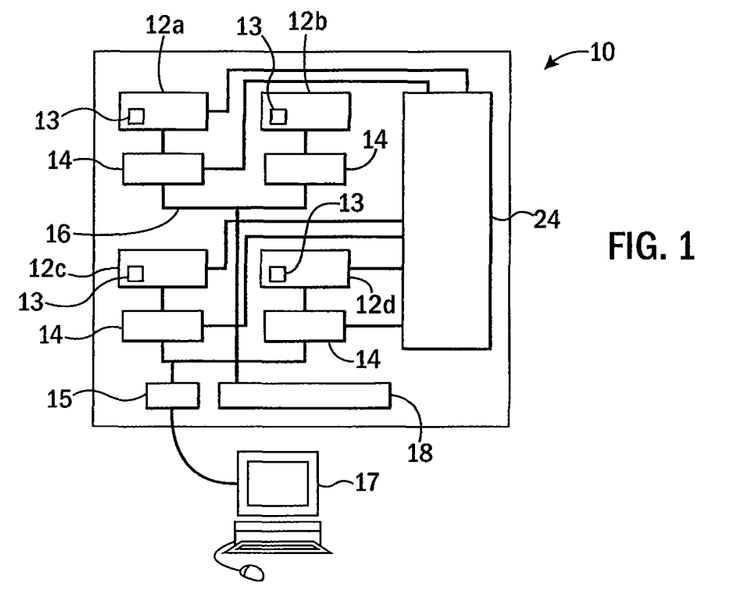
FIG. 1 is a simplified representation of the physical architecture of an example multiprocessor system having four processors and being one type of multiprocessor system suitable for implementation of the present application.

Referring now to FIG. 1, a multiprocessor system 10 may include, for example, four processors 12a-12d each associated with a local memory 14 and communicating on an interconnection network structure 16 with shared memory 18. It will be understood that the present application applies to cases where the local memory 14 and shared memory 18 are managed automatically by hardware (i.e., local memory 14 is a cache), as well as cases where software must explicitly perform transfers among shared memory 18 and local memories 14. It will be further understood that shared memory 18 may in turn communicate with additional external memory (not shown) or in fact may be comprised totally of local memories 14 accessed through communication protocols. Each of the processors 12 may also communicate with common control circuitry 24 providing coordination of the processors 12 whose operation controlled by firmware, discrete logic, or external software, will be described below. The multiprocessor system 10 may communicate through a port 15 with an external computer workstation 17 for programming, compiling or the like, as is understood in the art. Processors 12a-12d may also include precise interrupt circuitry 13 allowing and instruction being executed during an exception or interrupt to be identified together with the architectural state of that processor 12 at the time of that interrupt or exception.

Although the present application is described with respect to a multiprocessor implemented as separate processors communicating with shared memory, it will be understood that the term multiprocessor includes any type of computer system providing multiple execution contexts, including, but not limited to, systems composed of multi-threaded processors, multi-core processors, heterogeneous computational operations, or any combination thereof.

Figure 2:
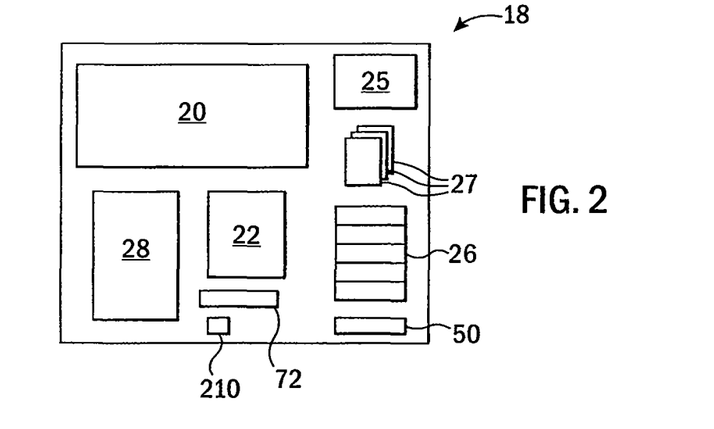
FIG. 2 is a simplified representation of the software elements of the present invention including a modified sequential model program for parallelization, associated libraries, data objects, and queue structures.

Referring now to FIG. 2, the shared memory 18 may hold a target program 20 to be parallelized, modified according to the present invention as will be described, and program data 22 accessed via the target program 20 during execution. Generally the target program 20 will be generated using a sequential programming model, meaning that all or part of the program was generated as if it would be executed on a single processor or as a single thread, however, the present invention can work with mixed statically parallel programs and sequential programming model programs as well.

Shared memory 18 may further include runtime library 25 possibly providing class specifications (i.e., object prototypes), generators for data objects 27 (to be described) and ordered communication structures (e.g., processor queues 26), and code to implement the run-time data set identifiers and addendum routines described in further detail herein below. The shared memory 18 may also include processor queues 26 associated with the processors 12 and a memory "shelf" 50 as will be described below. In addition, shared memory 18 may support a reorder list 72 and a global checkpoint store 210 as will be described below. It is contemplated that the memory 18 will also support an operating system 28 providing execution context for the above as will generally be understood in the art.

Computational Operations and Parallel Execution

Figure 3:
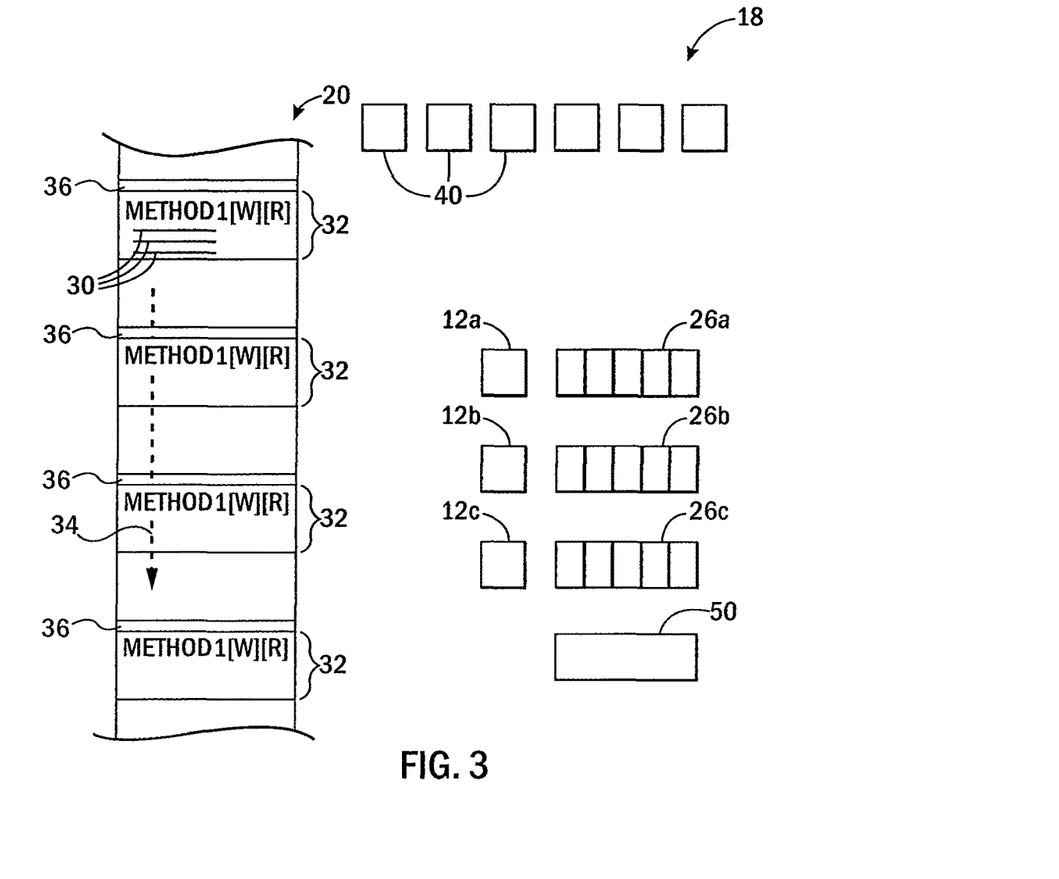
FIG. 3 is a logical diagram of the modified sequential model program of FIG. 2 showing computational operations comprised of groups of instructions labeled by the program generator (a human or possibly a software pre-processor) and associated with a data set identifier routine used in identifying read and write sets at run-time, also showing data objects holding read and write tokens, and processors and associated queues.

Referring now to FIG. 3, the target program 20 may comprise multiple computer executable instructions 30 (for examples instructions of the C++ programming language) collected in computational operations 32 designated in the Fig. as "methods". Generally, the target program 20 may comprise of different methods or multiple invocations of the same method as is shown in the figure. A computational operation 32, for example, may be a function, a subroutine, an object method, or other natural logical division of the target program 20.

In practice, a computational operation 32 will access data held in the shared memory 18 by reading or writing data from or to the shared memory 18. As depicted, each computational operation 32 may be designated with a unique title (e.g. method1) identifying the function of the computational operation 32 associated with a write set [W] and read set [R] indicating the data written to and read by the method (hence its argument(s) and value(s)). Thus, the designation "method1[w][r]" may represent a first computational operation 32 reading data [r] and writing to data [w]. It will be understood that the particular data of the write set and read set will typically be designated by a variable whose value may not be resolved at the time of program generation but determined only when the program is running. For this reason, the actual addresses of the read set and write set will frequently not be known by the program generator.

A given computational operation 32 (e.g. method1) of the target program 20 may be executed multiple times in different instances (either as part of different instantiated objects or repeated calls to a given function) and each different instance may have a different read set and write set dynamically determined during the execution of the target program 20. When the target program 20 is properly executed, these different instances execute in a serial execution order 34 representing the manner in which the target program 20 would execute, for example, on a single processor without data dependency conflicts. The serial execution order 34 is generally resolved only during execution of the target program 20 after flow control instructions in the serial model target program 20 are evaluated using actual data. The serial execution order 34 will generally differ from the static program order, for example, expressed in the source code of the target program 20 and will include dynamically determined loops, jumps and branches. In summary, the serial execution order 34 is the order in which the serial model target program 20 would execute without the parallelization of the present invention and in which all dependencies between instructions are properly resolved by the order of instruction execution.

Referring still to FIG. 3, the program generator, which maybe the programmer or a software pre-processor, may designate opportunities for parallelization by marking these computational operations 32 with a tag that both indicates the potential for parallelization and the extent of the computational operation. An example of such marking might be as follows:

database.static_xact_delegate (write_set1, read-set_1, db_xact)

where the computational operation 32 is of a type db_xact operating on data contained in a write_set1 and read-set_1 of database.

This marking invokes for each computational operation 32 a run-time, data object mapper 36 associated with the computational operation 32. For clarity, the data object mapper 36 is shown here as placed in-line in the serial execution order 34 in the target program 20 but in practice is only logically so positioned.

Generally, before execution of the computational operations 32 according to the serial execution order 34, the run-time data object mapper 36 will determine the write set and read set for the computational operation 32, most simply by examining the variable values designating the data to be written to or read from. The data object mapper 36 maps the resolved read set and write set to one or more data objects 40 each associated with individual or collections of program data 22 (shown in FIG. 2).

Generally, the data objects 40 define sets of program data 22, for example, as ranges of addresses, an object instantiation number, or set of records in a database. The mapping process may then be as simple as determining the address or record number of the data of the write or read sets of the computational operation 32 or the instance number of the object associated with a given method forming the computational operation 32 which is then mapped to the particular data object 40 having a comparable address range, record number range, or instantiation number.

The data objects 40 ideally define data sets that are "disjoint", meaning that they are accessed by one or a few computational operations 32 at one time. This definition of data objects 40 must balance a goal of collecting program data 22 into as large of sets as possible (coarse granularity) to minimize the number of data objects 40 required and the computational burden of the parallelizing operation, and in subdividing the data 22 as much as possible (fine granularity) to increase the possibilities of parallelization because the data objects are disjoint. This division may be informed by an understanding of the application by the programmer or may be done automatically by pre-processing of the program by a compiler or the like and may be redefined heuristically during program execution.

An example definition of data objects 40 for a banking database may divide the data of the database into data objects commensurate with the records of a single individual, reflecting an understanding that computational operations on one individual's records tend to be independent of operations on another individual's records.

Figure 4:
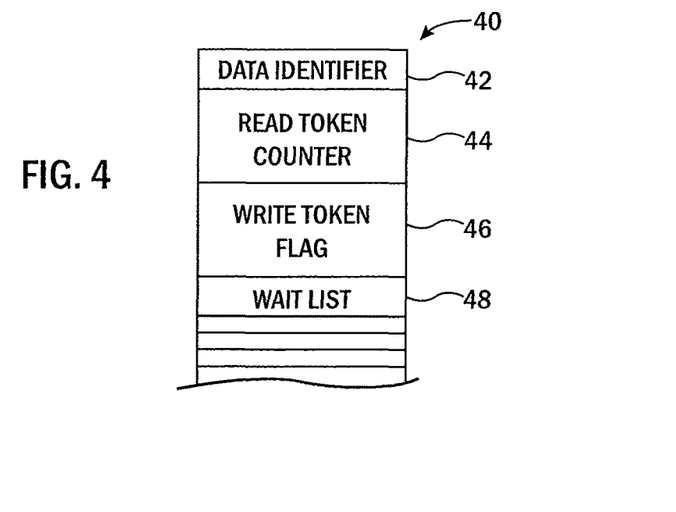
FIG. 4 is a detailed representation of a data object of FIG. 3.

Referring momentarily to FIG. 4, each of the data objects 40 may generally provide for identification data 42 pointing to the data it represents, for example, an address range or the like. In addition, the data object 40 may provide a read token counter 44 that may be incremented when a read token is granted and decremented when that read token is returned. The use of the counter permits an essentially unbounded number of read tokens to be granted while still tracking the total number of tokens outstanding with the expressed counter tally. A value of zero therefore indicates that all tokens have been returned. It will be appreciated that incrementing may alternatively be used to indicate the read token is returned and decrementing that the read token is taken and that this convention is arbitrary.

The data object 40 may also include a write token flag 46 reflecting the fact that each data object 40 has only a single write token and thus a counter is not required.

It will be appreciated that the read token counter 44 and the write token flag 46 may be implemented through a variety of structures including, for example, a single counter which may have a value of 0 when the write token has been taken, 1 when the write token is present and greater than 1 when read tokens have been taken, the number of granted tokens being the counter value minus one.

Finally, the data object 40 may include a wait list 48 which provides an ordered queue (according to a time at which a token is requested) of computational operations 32 requesting the tokens (read or write) which could not be provided to the computational operations 32 because the token is already taken. The wait list 48 may be any ordered communication structure such as a list or queue or the like.

Referring again to FIG. 2, ultimately, as will be described further below, each computational operation 32 is enrolled in one processor queue 26 associated with a given processor 12 which will execute the computational operations 32 so enrolled. When a computational operation 32 cannot be executed because the tokens it requires are not yet available, it may be placed on a shelf 50. It will be understood that the actual computational operation 32 need not be placed in the processor queue 26 or on the shelf 50, but this description refers to a logical location only. The processor queue 26 and shelf 50 may hold pointers or other identifying data. Generally, the processor queues 26 are general ordered communication structures that act logically as queues but may be any particular physical structure. Likewise, the shelf 50 may be any physical structure logically allowing temporary retention of computational operations as described.

Figure 5:
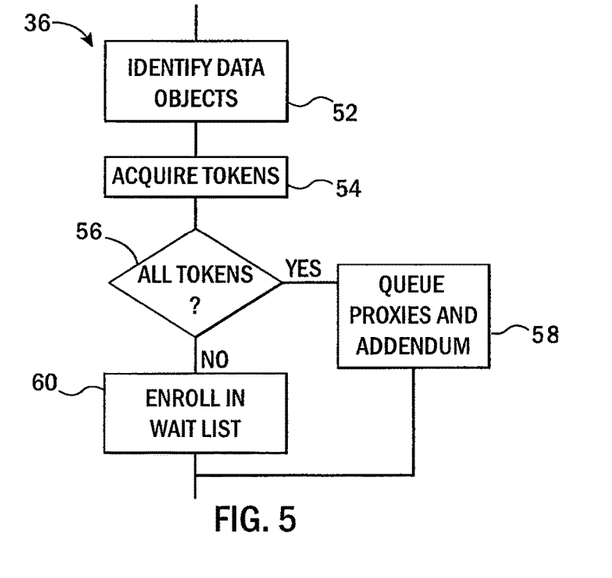
FIG. 5 is a flow chart of the data set identifier routine inserted into the program of FIG. 3 for identifying data sets at run time and obtaining necessary tokens.

Referring now to FIG. 5, the data object mapper 36 may operate not only to identify the necessary data objects 40 from which tokens must be obtained but may also provide instructions to manage enrolling computational operations 32 in the queues 26 or placing computational operations 32 on a shelf 50.

As described above, each data object mapper 36, as indicated by process block 52, initially operates to identify the data objects 40 associated with data accessed by a given computational operation 32 either to write to or read from that data. At process block 54, based on the identification at process block 52, the data object mapper 36 attempts to acquire the necessary tokens from the data objects 40. Generally, the acquisition of tokens, in one embodiment of the invention, follows the following rules:

(a) a write token may be granted only if it is available (not checked out by another computational operation 32 and there are no read tokens checked out, that is, the read token counter equals zero and the write token flag is set to "yes" in one embodiment); and (b) a read token may be granted only if the write token is available (that is, the write token flag is set to "yes" in one embodiment).

These rules prevent write-write dependency conflicts because writing must occur in the order of write token requests, and prevent write-read dependency problems because the write token is not granted if there are pending reads, and prevent read-write dependency problems because the read token may not be granted if there is a pending write operation.

If, at decision block 56, all the tokens for the computational operation 32 associated with the data object mapper 36 are obtainable, then at process block 58 the computational operation 32 is enrolled in a processor queue 26 for any available processor 12 together with an addendum program 66 as will be described.

If, on the other hand, all the tokens cannot be obtained for the computational operation 32 associated with the data object mapper 36, then those tokens which can be obtained may be obtained and then the data object mapper 36 places the computational operation 32, per process block 60, on a shelf 50 after the identity of the computational operation 32 is enrolled in the wait list 48 of all data objects 40 whose tokens were needed but not obtained.

As will be understood from the following description, the wait list 48 provides a queue function separate from the actual queues 26 that permits processors 12 to steal computational operations from other processors without upsetting the order structure enforced by the wait list 48.

Figure 6:
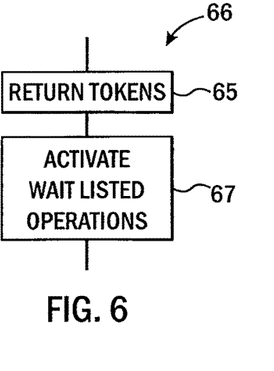
FIG. 6 is a flow chart of a token return routine inserted into a computational operation proxy when it is in queue.

Referring to FIG. 6, the addendum program 66 that will be added to the computational operation 32 when it is enrolled in a processor queue 26 (per process block 58 of FIG. 5) provides for the return of tokens at process block 65 after execution of the computational operation 32 by a processor 12. The addendum program 66 may further provide an activation of computational operations 32 that are at the top of the wait list 48, and that have been shelved, per process block 67. The return of tokens per block 65 may imply that a shelved computational operation now has all the read and write tokens needed for execution, whether provided as a result of the actions at block 66 or otherwise.

A detailed example of the operation of the above-described structure is provided in U.S. patent application Ser. No. 12/882,892 filed Sep. 15, 2010 and entitled "System and Method Providing Run-Time Parallelization of Computer Software Using Data Associated Tokens" hereby incorporated by reference in its entirety.

Precise Restartability

Figure 7:
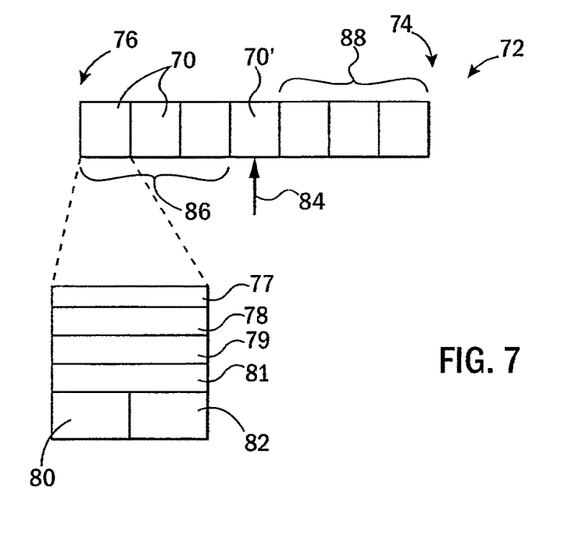
FIG. 7 is a logical diagram of a reorder list used to track dataflow execution order of computational operations together with state and execution process information.

Referring now to FIGS. 3 and 7, when a given computational operation 32 in queue 26 reaches a processor 12 it may be executed without "commitment" meaning generally that the memory objects 40 can be restored to an unaffected state. More generally, execution without commitment means that the execution may be "undone" so that it has no substantial residual effect on the architectural state of the multiprocessor computer system.

Execution without commitment may be performed either by not changing the memory objects 40 but rather changing a temporary file (for example, a future file) or by recording a reversionary copy of the memory objects in a temporary file (for example, a history file) when they are changed so that they can be restored to their earlier value. Either of these techniques may be used in the present invention; however, for the sake of clarity, the following description will discuss the history file approach.

Commitment of a computational operation 32 is controlled generally by a FIFO reorder list 72 as will now be described. At the time when a given computational operation 32 is discovered during execution, an element 70 for that computational operation 32 may also be generated in a FIFO reorder list 72. In its simplest form, this element 70 is ordered with respect to the other elements 70 in the reorder list 72 according to the serial execution order of the computational operations 32 in the program 20. Computational operations 32 are entered at a tail 74 of the reorder lists 72 and shift left toward the head 76 of the reorder lists 72 at which time those computational operations 32 are "committed" allowing them to change the data objects 40 and be removed from the reorder lists 72. It will be appreciated that the reorder list 72 defines a total order for execution of the computational operations 32 that is consistent with the data dependencies between computational operations 32 and that if the computational operations 32 were committed in the total order of the reorder list 72, a same result would be produced as execution of the computational operations 32 on a single processor.

Each element 70 of the reorder list 72 generally holds an identification 77 of the computational operation 32 (for example a pointer or identification number) together with a copy of its modification set 78. The modification set 78 of a computational operation 32 will generally be the objects 40 to which it will write, together with current values of the registers and flags (including the program counter) of its associated processor 12 before any modification by execution of the computational operation 32. This modification set 78 allows restoration of the objects 40 and a restarting of the computational operation 32 in the event that the computational operation 32 does not reach commitment.

The element 70 also provides for storage of an intra-processor state 79 for an architectural state of a processor 12 at the time of an interrupt or exception (loosely termed a "faulting" instruction), the architectural state being the data necessary for precise interruptability as is generally understood in the art. Again, this depiction is simply a logical diagram of the actual storage of this intra-processor state 79 that may physically remain in the individual processor 12. In an optional embodiment, each element 70 also provides a data dependency store 81 describing data dependency relationships between the computational operation 32 of the element 70 and other computational operations of other elements 70 in the reorder list 72.

In addition, each element 70 includes a completion flag 80 and an interrupt flag 82.

When execution of the computational operation 32 associated with an element 70 is completed by the processor 12, the completion flag 80 is set. This execution is not yet committed which occurs only when an element 70 for a completed computational operation 32 reaches the head 76 of the reorder list 72. At this time, the results of the execution have previously been written to the memory elements of the modification set 78 (that is, the objects 40) and the stored values of the modification set 78 of element 70 (needed to undo the execution) are removed from the reorder list 72.

In the event of an interrupt 84 during execution of a computational operation 32 on a given processor 12, the information from the precise interrupt circuitry 13 from the given processor 12 executing the computational operation 32 is preserved as intra-processor state 79 of the element 70 (designated in FIG. 7 as element 70'), the given processor 12 is halted, and the element 70' is marked by setting of the interrupt flag 82.

Processing of the interrupt 84 is delayed briefly while the computational operations 32 associated with elements 70 in a preceding region 86 of the reorder lists 72 (further toward the head 76 of the reorder list 72 from the element 70') continue to be committed. This commitment process proceeds until the element 70', having the set interrupt flag, is reached. The elements 70 in a succeeding region 88, including the given element 70' having the interrupt, are then squashed by restoring the values of the registers and objects 40 according to the stored modification sets 78 of those elements 70 starting at the youngest element 70 toward the tail 74 and proceeding toward the element 70' associated with the interrupt 84. If another interrupt occurs during this process, it simply is enrolled in order in the reorder list 72 and processed in turn.

At the conclusion of this process, the intra-processor state 79 is combined with the modification set 78 of elements 70' to yield an architectural state of high resolution that accurately reflects the current architectural state of the multiprocessor system 10. The interrupt is then serviced by jumping to the interrupt service routine. In some cases, the handling of the interrupt requires a reporting about details of the architectural state, for example, a reporting or use of memory values or register values, and the above process provides consistency in that reporting because of the consistent architectural state provided at the time the interrupt 84 is handled.

Upon completion of service of the interrupt, resumption of execution of the faulting instruction of the computational operation 32 of elements 70' (now at the head 76 of the reorder list 72) may be resumed at the saved high-resolution architectural state.

It will be appreciated that if, for some reason, the multiprocessor system 10 is unable to provide for precise restartability (for example because of hardware fault-detection latency) precise restarting from the faulting instruction of computational operation 32 elements 70' may not be possible. However, in this case, the multiprocessor system 10 may simply squash the entirety of the computational operation 32 of elements 70' subtending the interrupt 84 and can restart using the modification set 78 alone. In all events it will be possible and safe to restart the program by squashing all of the computational operations 32 in the reorder list 72. This technique is particularly useful for transient exceptions, where the exception will not inevitably be repeated together with repetition of execution of the computational operations.

Example I

Consider a program 20 providing the following method which repeats execution of a Function F "n" times:

```
for (i=0; i<n; i++) {
    Function F: [write set] [read set]
}
```

In each execution of the Function F (designated F1, F2, etc.), the write set and read set, being the data written to by the Function F and the data read by the Function F, may change as follows:
1. F1: [B, C][A]
2. F2: [D][A]
3. F3: [A, E][F]
4. F4: [B][D]
5. F5: [B][D]
6. F6: [G][H]

where the capital letters represent distinct data objects 40.

Figure 8:
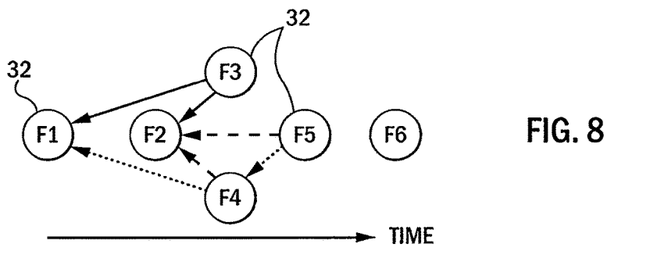
FIG. 8 is logical diagram of multiple computational operations showing data dependencies between the computational operations that require a data flow order in time.

Referring now to FIG. 8, a data dependence graph of these different computational operations F1-F6 depicts the data dependencies that constrain the order of execution of these computational operations 32. In general, parallel execution of computational operations 32 requires commitment of the computational operations 32 in a data flow order that observes the data dependency of this data dependence graph. The data flow order can be met by executing the computational operations 32 in the same ordering as sequential execution of the program 20; however, as will be seen, other orderings are also possible.

Of principal concern in the data flow ordering are portions of the program 20 that may write to the same data ("write after write" dependency), and portions of the program that may implement a reading of data subsequent to a writing of that data ("read after write" dependency), or a writing of data subsequent to a reading of the data ("write after read" dependency). Errors can result if any of these interdependent reads and writes change in order as a result of parallel execution.

In FIG. 8, computation F3 exhibits a write after read (WAR) dependency with respect to F1 because it writes an object A that is previously read by F1. It will be appreciated that the ultimate value of object A will change if the relative order of F1 and F3 change. WAR dependencies are indicated by solid line and a WAR dependency is also exhibited between computational operation F3 and computational operation F2. Computational object F4 has a write after write (WAW) dependency on computational operation F1 (indicated by the dotted lines) and so does F5 on F4 because each of these computational operations writes the value of B. For this reason, these relative orderings must also be observed. Finally F4 and F5 both have read after write (RAW) dependencies on computational operation F2 as indicated by a dashed line. Computational operations F1, F2, and F6, are independent without data dependencies.

Figure 9:
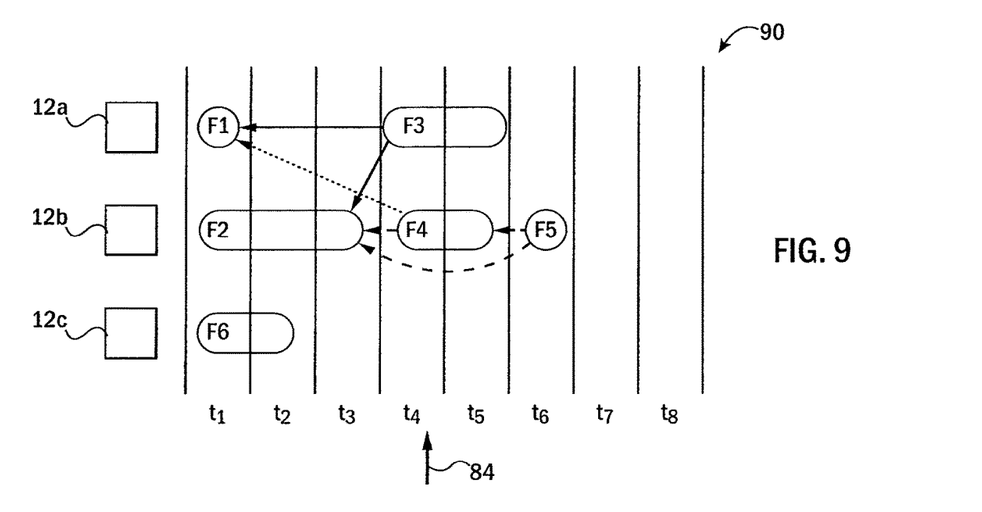
FIG. 9 is a plot of execution as a function of time for one possible scheduling of execution of the computational operations of FIG. 8 showing problems of imprecise architectural state resulting from parallel execution.

Referring now to FIG. 9, the token system described above with respect to managing data dependencies may be used to implement the execution of these computational operations 32 of F1-F6 according to a schedule 90 operating on three processors 12a-12c. This schedule 90 begins with simultaneous execution of computational operations F1, F2, and F6. Computational operation F2, in this example, requires three epochs (t1-t3) to complete. This in turn requires F3 and F4 to be delayed (serialized) until epoch t4 because of the data dependencies between F3 and F4 and F2. Computational operation F5 begins in epoch t6 and is dependent on computational operation F4.

Note that an interrupt 84 occurring during the execution of F4 in epoch t4 would result in an imprecise architectural state if the actual architectural state of the computer system were captured with F6 completed out of order with respect to the sequential execution of the program.

Figure 10:
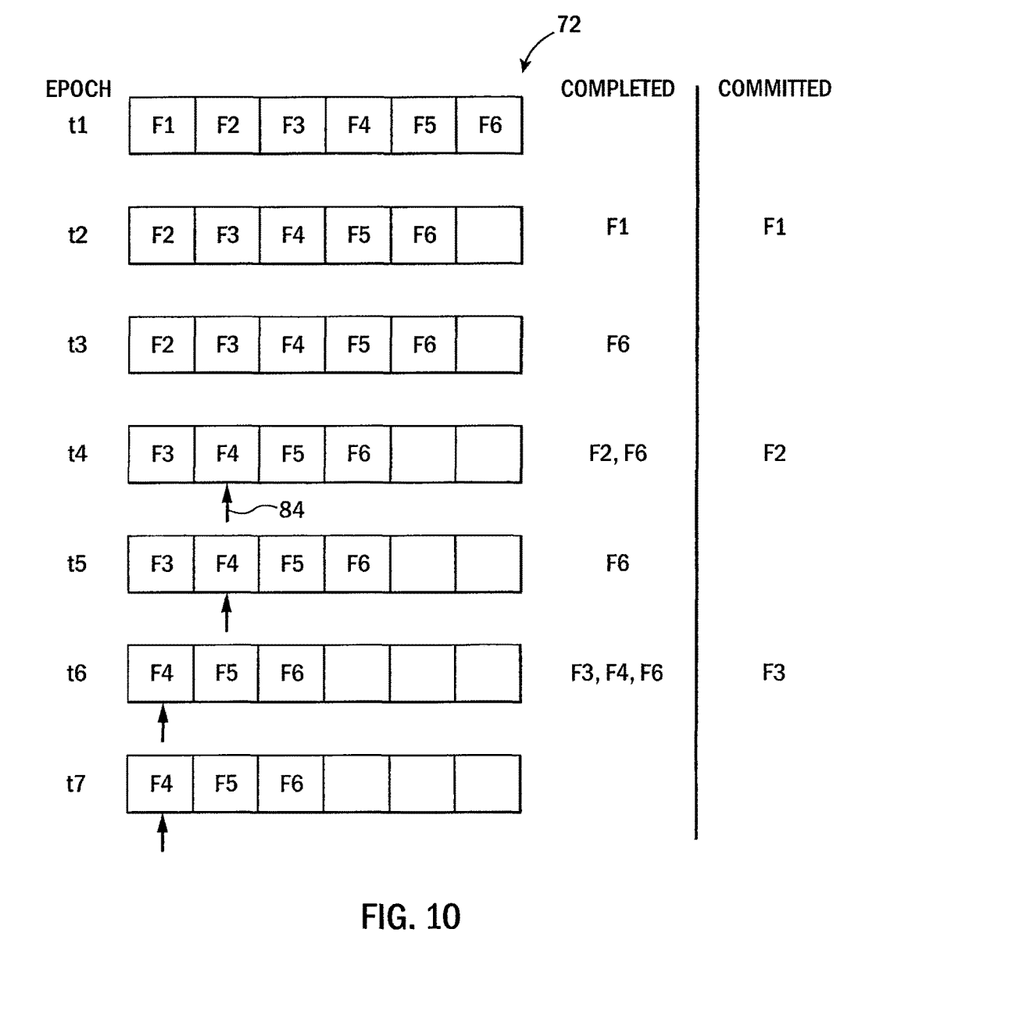
FIG. 10 is a diagram indicating changes in the entries of the reorder list of FIG. 7 during the execution of the computational operations of FIGS. 8 and 9.

Referring now to FIGS. 9 and 10, a precise architectural state is provided by monitoring program order and completion of the computational operations 32 using the reorder list 72. In epoch t1, each of F1-F6 is enrolled in the reorder list 72 with F1 being completed and committed in epoch t2. In epoch t2, F6 completes but is not committed because it has not reached the head of the reorder list 72. In epoch t3, F2 completes and is retired in epoch t4 when interrupt 84 occurs with respect to computational operation F4.

Assuming that an interrupt 84 arrives in epoch t4, the element 70 for computational operation F4 will be marked with an interrupt by interrupt flag 82 and the associated processor 12 halted and its architectural state recorded. Other processors 12 continue executing their respective computational operations 32 until commitment of computational operation F3 at epoch t6, computational operation F3 being the last computational operation preceding computational operation F4 in the reorder list 72. At this point, computational operation F4 reaches the head of the reorder list 72 and triggers a squashing of subsequent computational operations F5 and F6 and an augmenting of the modification set 78 of computational operation F4 with the architectural state captured by its processor 12 according to conventional techniques, to produce a precise restarting architectural state.

Selective Restartability

Figure 11:
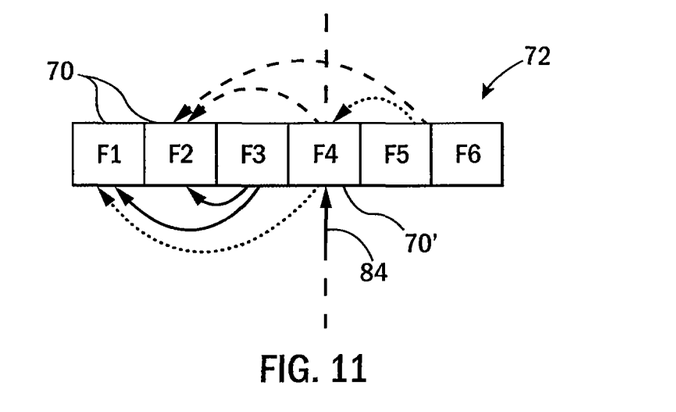
FIG. 11 is a figure similar to that of FIG. 7 showing reorder list marks with data dependencies to reveal a data flow order.

Referring now to FIG. 11, the hardware and mechanisms described above may also be used to provide for a selective restarting of processors associated with faulting computational operations 32, for example, indicated by interrupt 84. In selective restartability, the dependency relationships of the computational operations F1-F6 as enrolled in the reorder list 72 may be determined and recorded, for example, in the data dependencies store 81 associated with each element 70 as described above. The data dependencies may be extracted, for example, from the wait list 48 of each of the objects 40 described above.

These data dependencies may be used to deduce a data flow order differing from the serial execution order implicit in the above example. By considering the data flow order, at the time of the interrupt 84 during computational operation F4, only succeeding computational operations in the data flow order (and hence depending on the faulting computational operation 32 of element 70) need be squashed. In this case, computational operation F5 having a data dependency with faulting F4 may be squashed and the remaining computational operations F6 may continue to execute for greater computational efficiency. The data flow order describes an order strictly required by data dependency considerations. In this example the data flow order would be:

1. F1, F2
2. F3, F4,
3. F5 with F6 not included in the data flow order because it may execute independently.

In the above example, it will be recognized that F5 does not need to be squashed because F4 has not been committed and the dependency between F5 and F4 is a write after write (WAW) dependency. F5 would need to be squashed, however, if it had a read after write (RAW) dependency and F5 had begun.

In the present example, where there is no downstream dependency, F4 can further be restarted immediately, before it reaches the head of the reorder list, for an additional increase in performance.

This selective restarting may be useful, for example, with respect to intermittent thermal faults the latter representing a momentary inability to obtain data from memory, where simply re-executing the faulting computational operation 32 alone may be sufficient to remedy the fault without the need to execute an interrupt or exception routine. No precise architectural state is required in selective restarting. In this case, the above described reorder list 72 may be used simply to store data necessary for the purpose of squashing the dependent computational operations and, after a computational operation is committed, manage the process of freeing that data storage for other use. The reorder list 72 also simplifies the task of determining which computational operations need to be examined for data dependency by allowing inspection of only succeeding computational operations 32 in the reorder list 72.

Global Checkpoints

Figure 12:
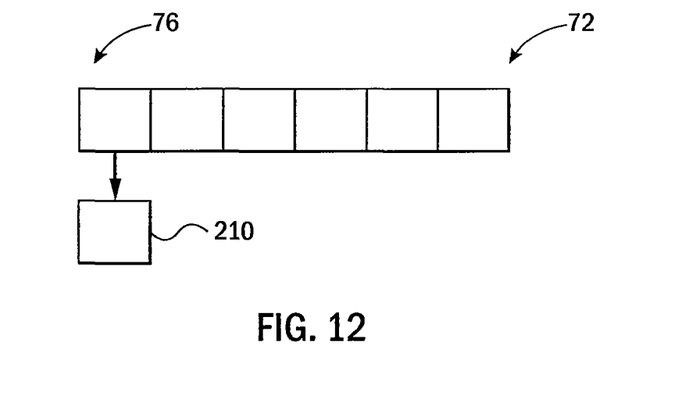
FIG. 12 is logical diagram of a reorder list and a checkpoint file for generation of global checkpoints.

Referring now to FIG. 12, global checkpoints may be created at the time of retiring each computational operation 32 at the head 76 of the reorder list 72 by capturing the modification set 78 at that time in a global checkpoint store 210. Such global checkpoints can help recover from "catastrophic" failures, for example, where the integrity of the system is suspect or may aid in migrating the program to a different computer or analyzing the execution of the program provided that the program is restarted immediately after the checkpointed instruction.

Other Considerations

It will be appreciated that a variety of different techniques may be used to establish the total order and/or data flow order of computational operations including those described in U.S. patent application Ser. No. 12/543,354 filed Aug. 18, 2009, and entitled: "System And Method For Dynamic Dependence-Based Parallel Execution Of Computer Software", and U.S. Pat. patent application Ser. No. 12/858,907 filed Aug. 18, 2010 and entitled: "System and Method Providing Run-Time Parallelization of Computer Software Accommodating Data Dependencies", both hereby incorporated by reference. It is necessary only that the total order provide a unique and reproducible ordering of all of the concurrent processes; use of program textual order, is only one example. For example, processes A, B, C, D, may occur in this textual (sequential) order in the program but during execution be encountered in a cycling pattern of (A,B,C,D), then (B,C,D,A), then (C,D,A,B), then (D,A,B,C) and then the pattern repeats. Knowing this pattern, a total order can be derived for precise restartability, but the order would be neither the sequential order nor static.

Generally the present invention may be implemented in any of a combination of hardware, firmware, and software including operating system software executing on all or some of the processors of the multiprocessor system.

Certain terminology may be used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "multiprocessor system" or "a computer system" can be understood to include one or more processors on the same substrate or package or multiple processors inter-communicating in a distributed environment(s), Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A method for processing a computer program in a multiprocessor computer system comprising the steps of:
   (a) dividing the computer program into multiple portions having multiple instructions which may be interrupted and distributing the portions among multiple physical processors of the multiprocessor computer system for parallel execution, each of the processors having an independent dedicated program counter and dedicated circuitry to receive independent interrupts directed to each given one of the multiple processors;
   (b) defining a total order of the instructions of the portions before all the instructions of the portions are executed and ready for commitment of the instructions, that preserves correct resolution of data dependencies among the instructions, and that provides a unique ordering selected from different given possible orderings that would preserve correct resolution of data dependencies;
   (c) at an interrupt time when a first processor of the multiple physical processors executing a first portion receives an interrupt in the first portion, coordinating execution of other portions on processors other than the first processor, by using the total order to create an architectural state of the multiprocessor computer system of all processors, by completion of all instructions of the other portions of the other processors when those other portions precede the first portion of the first processor in the total order and squashing all executed instructions in the other portion of the other processors when those other portions succeed the first portion of the first processor in the total order for portions on processors other than the first processor;
   (d) after completion of (c), handling the interrupt; and
   (e) after completion of (d), resuming execution of the parallel portions from the architectural state.

2. The method of claim 1 wherein handling of the interrupt requires data describing the architectural state.

3. The method of claim 1 further including the step of creating a check point with respect to data modified by the portions before a commitment of an execution of a portion so that the portion may be squashed after execution but before commitment.

4. The method of claim 3 wherein step (c) creates the architectural state by first completing all instructions of the portions preceding the given portion in the total order and squashing all instructions in the portions succeeding the given portion in the total order, where instructions when squashed leave substantially no residual effect on the architectural state of the multiprocessor computer system.

5. The method of claim 1 further including the steps of recording a given architectural state of the given processor at the interrupt time and wherein the architectural state is also based on the given architectural state.

6. The method of claim 5 wherein the architectural state of a processor is a state of memory accessed by the computational operation executed by the processor and register values of the processor on which the computational operation was executed.

7. The method of claim 5 wherein the interrupt is selected from a group consisting of: a hardware interrupt, a software interrupt, and an execution exception.

8. The method of claim 1 further including the steps of:
   in the event of a fault in execution of a given portion on a given processor, determining dependent portions distributed to processors other than the given processor having data dependencies on the given portion; and
   only after step (c) restarting that given portion and the dependent portions while allowing continued execution of other portions on processors other than the given processor.

9. The method of claim 8 further including the steps of generating a reorder list having an entry for each portion at a time of discovery of the portion during the dividing process of step (a) defining a total order of the portions and storing in the reorder list information necessary for squashing of the portions and wherein data dependencies are determined only for portions in the reorder list after the given portion.

10. The method of claim 9 wherein the execution of portions is committed according to the ordering of the reorder list and at the time of committing the entry for each committing portion in the reorder list releasing storage of the information necessary for squashing of the portion.

11. The multiprocessor computer system of claim 8 wherein the fault is selected from the group consisting of: a thermal fault, a voltage emergency, and a timing fault.

12. The method of claim 1 wherein the step of coordinating execution of other portions on processors other than the first processor, completes all instructions of the other portions of the other processors when those other portions precede the first portion of the first processor in the total order and squashes all executed instructions in the other portions of the other processors when those other portions succeed the first portion of the first processor in the total order for portions on processors other than the first processor, regardless of whether instructions of the portions of the other processors were executed before or after the interrupt.

13. A multiprocessor computer system for executing a computer program, the multiprocessor computer system executing program steps fixed in non-transient medium to:
   (a) divide the computer program into multiple portions having multiple instructions which may be interrupted and distributing the portions among multiple physical processors of the multiprocessor computer system for parallel execution, each of the processors having an independent dedicated program counter and dedicated circuitry to receive independent interrupts directed to each given one of the multiple processors;
   (b) defined a total order of the instructions of the portions before all the instructions of the portions are executed and ready for commitment of the instructions, that preserves correct resolution of data dependencies among the instructions, and that provides a unique ordering selected from different given possible orderings that would preserve correct resolution of data dependencies;
   (c) at an interrupt time when a first processor of the multiple physical processors executing a first portion receives an interrupt in the first portion, coordinate execution of other portions on processors other than the first processor, by using the total order to create an architectural state of the multiprocessor computer system of all processors, by completion of all instructions of the other portions of the other processors when those other portions precede the first portion of the first processor in the total order and squashing all executed instructions in the other portions of the other processors when those other portions succeed the first portion of the first processor in the total order for portions on processors other than the first processor;

(d) after completion of (c), handle the interrupt; and (e) after completion of (d), resume execution of the parallel portions from the architectural state.

14. The multiprocessor computer system of claim 13 wherein step (c) captures the architectural state by first completing all instructions of the portions preceding the interrupted instruction in the total order and squashing all instructions in the portions succeeding the interrupted instruction in the total order, where instructions when squashed leave no substantial residual effect on the architectural state of the multiprocessor computer system.

15. The multiprocessor computer system of claim 9 wherein the multiprocessor computer system further records a given architectural state of the given processor at the interrupt time and wherein the architectural state is also based on the given architectural.

16. The multiprocessor computer system of claim 15 wherein the architectural state of a processor is a state of memory accessed by the computational operation executed by the processor and register values of the processor on which the computational operation was executed.

17. The multiprocessor computer system of claim 15 wherein the interrupt is selected from a group consisting of: a hardware interrupt, a software interrupt, and an execution exception.

18. The multiprocessor computer system of claim 13 wherein the multiprocessor computer system further:

in the event of a fault in execution of a given portion on a given processor, determine dependent portions having data dependencies on the given portion and distributed to processors other than the given processor; and only after (c) restart that given portion and the dependent portions while allowing continued execution of other portions distributed to processors other than the given processor.

19. The multiprocessor computer system of claim 18 wherein execution of the computer program further generates a reorder list having an entry for a portion at a time of discovery of the portion during the dividing process of step (a) defining a total order of the portions and stores in the reorder list information necessary for squashing of the portions and wherein data dependencies are determined only for portions in the reorder list after the given portion.

20. The multiprocessor computer system of claim 19 wherein the execution of portions is committed according to the ordering of the reorder list and at the time of committing the entry for each committing portion in the reorder list releasing storage of the information necessary for squashing of the portion.

21. The multiprocessor computer system of claim 18 wherein the total order is identical to an ordering of the program on a single processor.

22. The multiprocessor computer system of claim 18 wherein the multiprocessor computer system coordinates execution of other portions on processors other than the first processor by completing all instructions of the other portions of the other processors when those other portions precede the first portion of the first processor in the total order and squashing all executed instructions in the other portions of the other processors when those other portions succeed the first portion of the first processor in the total order for portions on processors other than the first processor, regardless of whether instructions of the portions of the other processors were executed before or after the interrupt.

* * * * *